United States Patent
Mehta et al.

(10) Patent No.: US 11,664,031 B2
(45) Date of Patent: May 30, 2023

(54) MULTI-MODE VOICE TRIGGERING FOR AUDIO DEVICES

(71) Applicant: Apple Inc., Cupertino, CA (US)

(72) Inventors: Dersheet C. Mehta, Canoga Park, CA (US); Dinesh Garg, San Jose, CA (US); Sham Anton Koli, San Jose, CA (US); Kerry J. Kopp, Los Altos Hills, CA (US); Hans Bernhard, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 174 days.

(21) Appl. No.: 17/199,428

(22) Filed: Mar. 11, 2021

(65) Prior Publication Data

US 2022/0293110 A1 Sep. 15, 2022

(51) Int. Cl.
*G10L 15/32* (2013.01)
*G10L 15/22* (2006.01)
*G10L 15/30* (2013.01)
*G10L 15/08* (2006.01)

(52) U.S. Cl.
CPC ............ *G10L 15/32* (2013.01); *G10L 15/083* (2013.01); *G10L 15/22* (2013.01); *G10L 15/30* (2013.01); *G10L 2015/088* (2013.01); *G10L 2015/223* (2013.01)

(58) Field of Classification Search
CPC ....... G10L 15/32; G10L 15/083; G10L 15/22; G10L 15/30; G10L 2015/088
USPC ........................................................ 704/231
See application file for complete search history.

(56) References Cited

U.S. PATENT DOCUMENTS

| | | | | |
|---|---|---|---|---|
| 10,097,973 B2* | 10/2018 | Gross | ..................... | H04W 4/50 |
| 10,147,422 B2* | 12/2018 | Mengibar | ............. | G06F 40/242 |
| 10,200,824 B2* | 2/2019 | Gross | ..................... | G06F 9/445 |
| 10,283,116 B2* | 5/2019 | Ko | .......................... | G10L 15/22 |
| 10,283,118 B2* | 5/2019 | Mengibar | .............. | G10L 15/22 |
| 10,677,484 B2* | 6/2020 | Ribbich | ............. | G05D 23/1934 |
| 10,735,905 B2* | 8/2020 | Gross | ................. | G06F 3/04883 |
| 10,757,552 B2* | 8/2020 | Gross | .................... | H04W 4/025 |
| 10,827,330 B2* | 11/2020 | Gross | ............... | H04M 1/72469 |
| 11,017,769 B2* | 5/2021 | Mengibar | .............. | G10L 15/08 |
| 11,070,949 B2* | 7/2021 | Gross | .................... | G06F 3/0488 |

OTHER PUBLICATIONS

Sonos, "Adding Voice Services to Sonos," retrieved from https://support.sonos.com/s/article/3550?language=en_US, 2020, 2 pages.

* cited by examiner

*Primary Examiner* — Susan I McFadden
(74) *Attorney, Agent, or Firm* — BakerHostetler

(57) ABSTRACT

Implementations of the subject technology provide systems and methods for multi-mode voice triggering for audio devices. An audio device may store multiple voice recognition models, each trained to detect a single corresponding trigger phrase. So that the audio device can detect a specific one of the multiple trigger phrases without consuming the processing and/or power resources to run a voice recognition model that can differentiate between different trigger phrases, the audio device pre-loads a selected one of the voice recognition models for an expected trigger phrase into a processor of the audio device. The audio device may select the one of the voice recognition models for the expected trigger phrase based on a type of a companion device that is communicatively coupled to the audio device.

21 Claims, 5 Drawing Sheets

MULTI-MODE VOICE TRIGGERING FOR AUDIO DEVICES

TECHNICAL FIELD

The present description relates generally to media output devices and, more particularly, for example, to voice triggering for audio devices.

BACKGROUND

Audio devices such as headphones and earbuds can receive audio data from a companion device over a wired or wireless connection. In some cases, an audio device can include a microphone to receive audio input that can be transmitted to the companion device.

BRIEF DESCRIPTION OF THE DRAWINGS

Certain features of the subject technology are set forth in the appended claims. However, for purpose of explanation, several aspects of the subject technology are set forth in the following figures.

DETAILED DESCRIPTION

Figure 1:
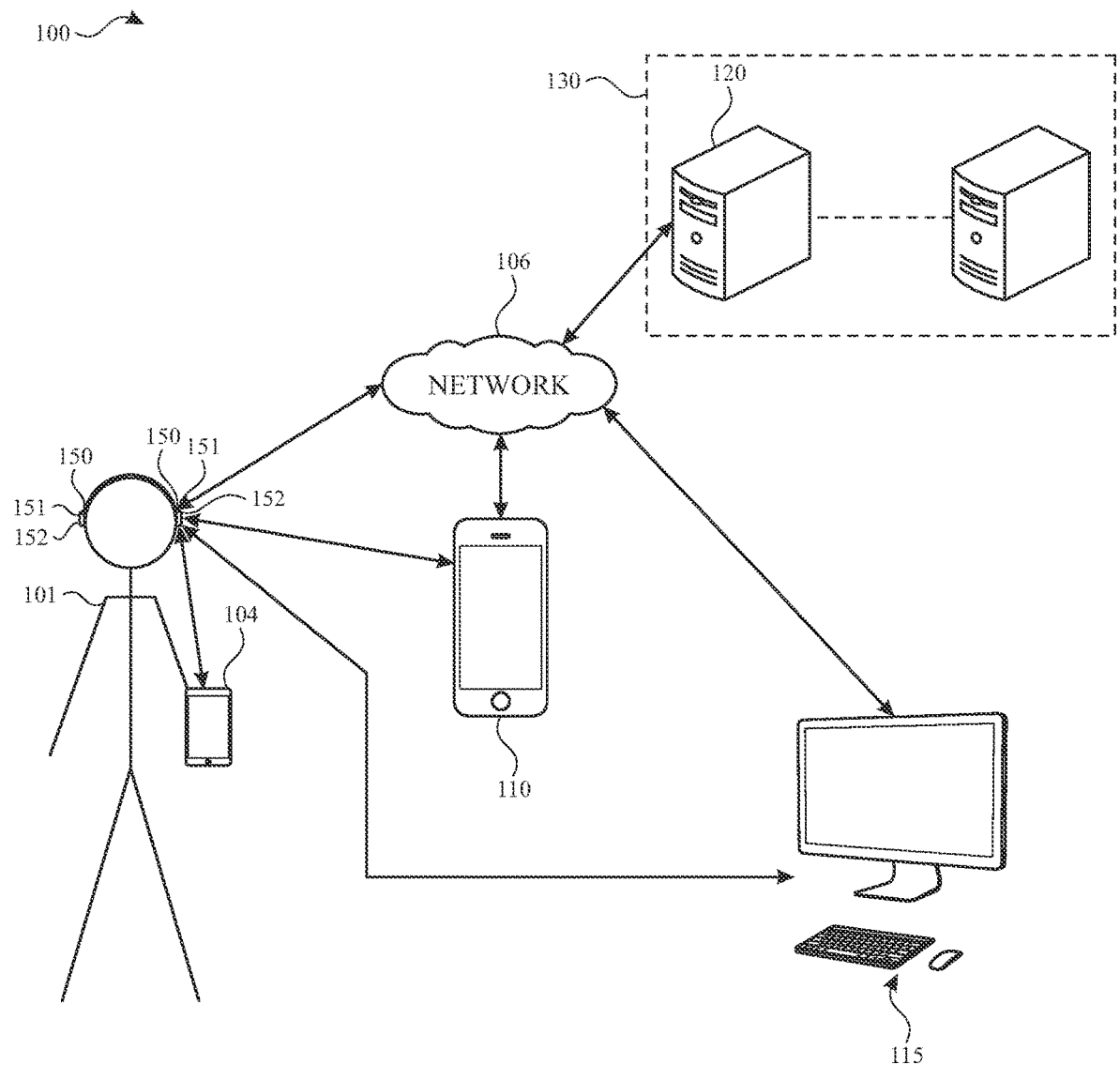
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electronic devices such as smartphones, wearable devices, and tablet devices can provide an application, such as a virtual assistant application, that responds to spoken inputs received using an audio transducer (e.g., a microphone) of the device. The virtual assistant application may include and/or utilize one or more voice recognition models for interpreting the spoken inputs, such as to differentiate and/or detect various words and/or phrases that the models are trained to recognize. The virtual assistant application may be activated, by a specific and/or pre-configured trigger phrase, to begin listening for further spoken inputs. In one or more implementations, a virtual assistant application may be a native application for an electronic device, and as such, the trigger phrase would be specific to a manufacturer of the device, to a provider of an operating system of the device, In one or more implementations, a virtual assistant application may be provided to an electronic device by a third party that is different from the manufacturer of the device and the provider of the operating system of the device, and as such, the trigger phrase would be specific to the third party that provides the virtual assistant on the device. In one or more implementations, an electronic device may provide multiple virtual assistant applications (e.g., multiple virtual assistants) from multiple providers, each having a specific trigger phrase.

In various scenarios, a user of an electronic device having a virtual assistant application may use a media output device, such as an audio output device (e.g., headphones or earbuds) to output media content from the electronic device. The media output device may also include an audio transducer such as a microphone that can be used to capture audio input such as spoken inputs from the user, for transmission to the electronic device for processing. As described in further detail hereinafter, the electronic device and/or the media output device may include one or more other components such as speakers, accelerometers, touch sensors, displays, buttons, switches, force sensors, etc.

In some scenarios, it may be desirable to utilize the microphone of the media output device to detect a trigger phrase for a virtual assistant application of a companion device, such as an electronic device that is paired with the media output device as a source for media content. However, at various times, a media output device can be paired, unpaired, connected, and/or disconnected from various electronic devices from various manufacturers and with various virtual assistant applications, each with its own unique and/or specific trigger phrase. Moreover, because many media output devices, such as headphones and earbuds, are compact devices with limited power and/or processing resources, it can be impractical for a media output device itself to run a voice recognition model that is capable of detecting and differentiating between the various trigger phrases for the various virtual assistant applications.

Implementations of the subject technology described herein provide voice triggers for virtual assistant functionality for various virtual assistants from various providers, via an audio output device (e.g., headphones or earbuds). In order, for example, to provide a low power listening mode that can trigger the appropriate virtual assistant application without requiring complex models to differentiate words in spoken inputs (e.g., the trigger phrases of the different virtual assistants), prior to performing listening operations, the audio output device may determine what type of companion device it is connected to, and load a voice recognition model that is specific to that device type into a processor of the audio output device. Then, the loaded type-specific voice recognition model can be used in a low power listening mode that specifically listens for a single corresponding trigger phrase for a specific virtual assistant application. In various implementations, voice recognition model can be loaded from memory (e.g., memory 305) at the audio output device or can be loaded on-the-fly from a connected electronic device (e.g., a companion device) or from a remote server.

In one or more implementations, the audio output device may determine which virtual assistant is running at the companion device and/or which of several virtual assistants at the companion device is a primary virtual assistant (e.g., based on an indication from the companion device, and with or without determining a device type of the companion device). In these implementations, the audio output device may load a voice recognition model that is specific to the running and/or primary virtual assistant at the companion device into a processor of the audio output device. Then, the loaded assistant-specific voice recognition model can be used in a low power listening mode that specifically listens for a single corresponding trigger phrase for a specific virtual assistant application.

When an output of the pre-loaded type-specific (and/or assistant-specific) voice recognition model at the audio output device indicates that the corresponding trigger phrase for that model has been detected, cooperative operations between the audio output device and the companion device can be performed to provide the corresponding virtual assistant functionality. Because the type-specific (and/or assistant-specific) voice recognition model is trained to detect a specific trigger phrase (e.g., rather than identifying or distinguishing between different spoken words), the low-power listening mode can be performed at the audio output device using limited computing resources.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes a media output device 150, an electronic device 104 (e.g., a handheld electronic device such as a smartphone or a tablet), an electronic device 110, an electronic device 115, and a server 120 communicatively coupled by a network 106 (e.g., a local or wide area network). For explanatory purposes, the system architecture 100 is illustrated in FIG. 1 as including the media output device 150, the electronic device 104, the electronic device 110, the electronic device 115, and the server 120; however, the system architecture 100 may include any number of electronic and/or audio devices and any number of servers or a data center including multiple servers.

The media output device 150 may be implemented as an audio output device such as a smart speaker, headphones (e.g., a pair of speakers mounted in speaker housings that are coupled together by a headband), or an earbud (e.g., an earbud of a pair of earbuds each having a speaker disposed in a housing that conforms to a portion of the user's ear) configured to be worn by a user (also referred to as a wearer when the audio output device is worn by the user), or may be implemented as any other device capable of outputting audio, video and/or other types of media (e.g., and configured to be worn by a user). Each media output device 150 may include one or more audio transducers such as a speaker 151 configured to project sound into an ear of the user 101. Each media output device 150 may include one or more audio transducers such as a microphone 152 configured to receive audio input such as voice inputs.

Although not visible in FIG. 1 (see, e.g., FIG. 3 and/or FIG. 6), each media output may include processing circuitry (e.g., including memory and/or one or more processors) and communications circuitry (e.g., one or more antennas, radio frequency circuits, etc.) for receiving and/or processing audio content from one or of the electronic device 104, the electronic device 110, the electronic device 115, and/or the server 120. The processing circuitry of the media output device or another device may operate the speaker 151 to generate sound according to the audio content. The memory may store one or more machine learning models for detecting one or more corresponding words or phrases, such as one or more corresponding trigger phrases that are each specific to a virtual assistant application of a particular provider. For example, each of electronic device 104, electronic device 110, and electronic device 115 may include at least one virtual assistant application that is activated by a corresponding trigger phrase. In various implementations, electronic device 104, electronic device 110, and electronic device 115, and media output device 150 may be provided by a common provider (e.g., a common manufacturer or a common operating system provider) or may be provided by one or more different providers, and may have the same virtual assistant application or different virtual assistant applications.

The media output device 150 may include communications circuitry for communications (e.g., directly or via network 106) with the electronic device 104, the electronic device 110, the electronic device 115, and/or the server 120, the communications circuitry including, for example, one or more wireless interfaces, such as WLAN radios, cellular radios, Bluetooth radios, Zigbee radios, near field communication (NFC) radios, and/or other wireless radios. The electronic device 104, the electronic device 110, an electronic device 115, and/or the server 120 may include communications circuitry for communications (e.g., directly or via network 106) with media output device 150 and/or with the others of the electronic device 104, the electronic device 110, the electronic device 115, and/or the server 120, the communications circuitry including, for example, one or more wireless interfaces, such as WLAN radios, cellular radios, Bluetooth radios, Zigbee radios, near field communication (NFC) radios, and/or other wireless radios.

At a given time, the media output device 150 may be paired with one or more companion devices such as one or more of the electronic device 104, the electronic device 110 and/or the electronic device 115. During operation, the media output device 150 may connect to and/or disconnect from any of the one or more paired companion devices.

Media output device 150 may also include one or more sensors such as touch sensors and/or force sensors for receiving user input. For example, a user/wearer of media output device 150 may tap a touch sensor or pinch the force sensor briefly to control the audio content being played, to control volume of the playback, and/or to toggle between modes of operation. In one or more implementations, the user may hold down the force sensor to send a trigger signal to a connected companion device, such as a trigger signal to activate the virtual assistant operation at the companion device.

The electronic device 104 may be, for example, a smartphone, a portable computing device such as a laptop computer, a peripheral device (e.g., a digital camera, headphones, another audio device, or another media output device), a tablet device, a wearable device such as a smart watch, a smart band, and the like, any other appropriate device that includes, for example, processing circuitry and/ or communications circuitry for providing audio content to media output device(s) 150. In FIG. 1, by way of example, the electronic device 104 is depicted as a mobile smartphone device with a touchscreen. In one or more implementations, the electronic device 104 and/or the media output device 150 may be, and/or may include all or part of, the electronic device discussed below with respect to the electronic system discussed below with respect to FIG. 6.

The electronic device 115 may be, for example, a desktop computer, a portable computing device such as a laptop computer, a smartphone, a peripheral device (e.g., a digital camera, headphones, another audio device, or another media output device), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 6.

The server 120 may form all or part of a network of computers or a group of servers 130, such as in a cloud computing or data center implementation. For example, the server 120 stores data and software, and includes specific hardware (e.g., processors, graphics processors and other specialized or custom processors). In an implementation, the server 120 may function as a cloud storage server.

Figure 2:
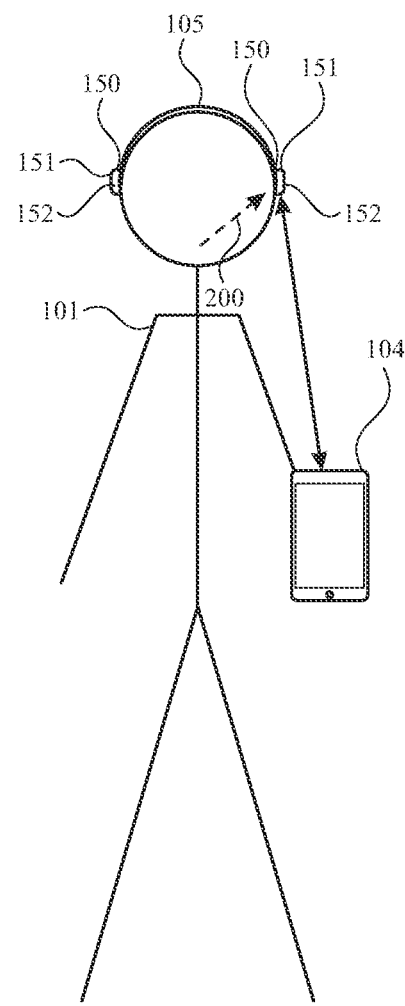
FIG. 2 illustrates an example of an environment that includes a media output device receiving a voice input in accordance with implementations of the subject technology.

FIG. 2 illustrates an environment in which a user 101 is wearing a media output device 150 that is paired with and connected to electronic device 104, as a companion device. In the example of FIG. 2, media output device 150 may be operated to output audio content (e.g., streaming audio content, audio content for a phone call or a video conference, or the like) received from electronic device 104, using speaker(s) 151, and/or to receive audio input using microphone(s) 152. In the example of FIG. 2, the electronic device 104 may be in an active state or an inactive state, and the media output device 150 may be in a low power mode and performing a low power listening operation to detect a trigger phrase that is specific to a virtual assistant application at the electronic device 104.

In the example of FIG. 2, a voice input 200 from the wearer of the media output device 150 is received by a microphone 152 of the media output device 150. As discussed in further detail hereinafter, media output device 150 may have previously loaded a voice recognition model that is trained to detect the trigger phrase in audio input, into a processor (e.g., into on-chip memory of a processor integrated circuit (IC)) of the media output device. When the voice input 200 includes the trigger phrase (e.g., when the user 101 speaks the trigger phrase), an output of the previously loaded voice recognition model may cause the media output device 150 send a trigger signal to the electronic device 104 to activate the virtual assistant operation at the electronic device.

Figure 3:
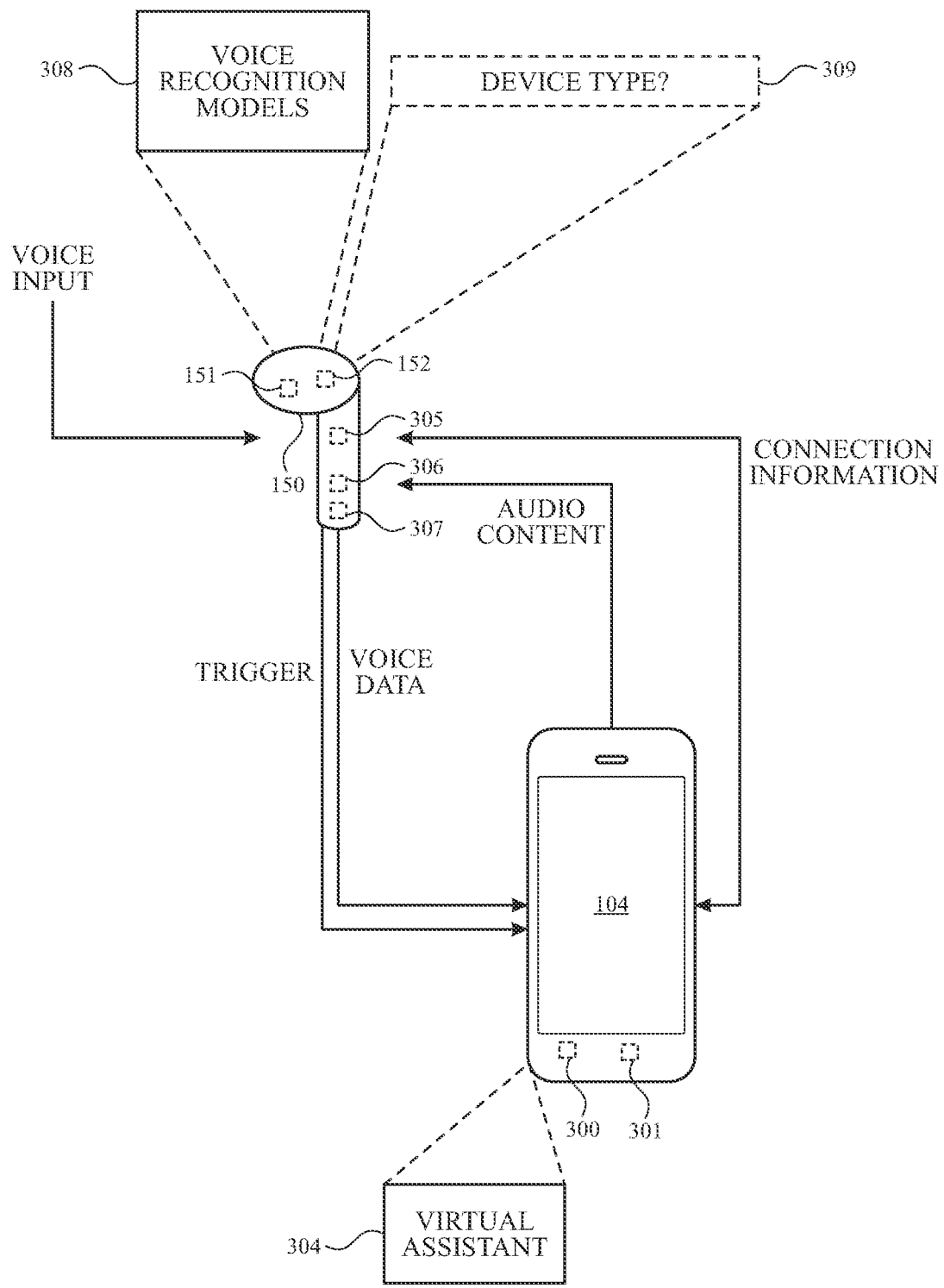
FIG. 3 illustrates a schematic diagram illustrating a media output device in communication with a companion device in accordance with implementations of the subject technology.

FIG. 3 is a schematic diagram that illustrates information and/or operations that can be utilized and/or performed by electronic device 104 and/or media output device 150 to provide, for example, multi-mode voice triggering by the media output device. As shown in FIG. 3, media output device 150 may store multiple voice recognition models 308 locally at the media output device, such as in memory 305. Each of the voice recognition models 308 may be trained to detect a particular corresponding trigger phrase, that itself corresponds to a device type. Although voice recognition models 308 are shown as being stored at the media output device 150 in FIG. 3, in one more implementations, voice recognition models 308 may also, or alternatively, be stored at the electronic device 104 and/or a remote device such as server 120 (FIG. 1). Voice recognition models 308 may include a single model for each trigger phrase, or can include multiple models for one or more trigger phrases. For example, in one or more implementations, voice recognition models 308 may include a standard voice recognition model and a premium voice recognition model, each trained to recognize the same trigger phrase. For example, the premium voice recognition model may include a larger parameter set than the standard voice recognition model for the same trigger phrase, and may thus be able to detect the trigger phrase is a wider variety of noise conditions, by a wider variety of input voices, or in audio inputs with lower signal-to-noise than the standard voice recognition model (as examples). In this example, the premium voice recognition model may be selected and loaded by devices with relatively more memory and/or processing resources, and the standard voice recognition model may be selected and loaded by devices (e.g., from a same or different vendor) with relatively less memory and/or processing resources.

As illustrated in FIG. 3, the media output device 150 may include one or more selected components, including memory 305, a processor 306, and a sensor 307. In one or more implementations, memory 305 may be memory that is separate from on-chip memory of the processor 306 (e.g., a digital signal processor (DSP) or other processor IC). In various implementations, the processor 306 may perform all of the processing for media output device 150 or media output device 150 may include one or more other processors that perform some of the processing functions of the media output device (e.g., device type detection, pairing and/or connection operations, processing audio content from a connected (companion) device). Sensor 307 may include a touch sensor and/or a force sensor for receiving user inputs at the media output device. Sensor 307 may form and/or be included in, for example, a button that is pressable by the user, such as a compressible button or a touch-sensitive button.

As further illustrated in FIG. 3, electronic device 104 and media output device 150 may exchange connection information. The connection information may include security information (e.g., keys for secure communication) that are generated and/or exchanged during a pairing process for the electronic device 104 and the media output device 150. Once paired, additional connection information may be exchanged to connect the electronic device 104 to the media output device 150 as a companion device. The additional connection information may include packets of data (e.g., Bluetooth packets when the connection being established is a Bluetooth connection) transmitted from the electronic device 104 to the media output device 150, the packets including device information that can be used to determine a device type of the electronic device 104. For example, the device information may include a vendor identifier (ID) or a media access control (MAC) address that may indicate a device type (e.g., a manufacturer, an operating system, or other identifier) of the electronic device 104. In one or more implementations, the device type of the electronic device 104 corresponds to a manufacturer of the electronic device. In various implementations, the device type of the electronic device 104 may be the same as, or different from, a manufacturer of the media output device 150.

In one or more implementations, the media output device 150 may store a list of paired devices, which are trusted for connection to the media output device 150 (e.g., based on prior pairing operations). The voice recognition models 308 and/or the list of paired devices can be stored, for example, in memory 305 of the media output device 150 and/or in memory of a another devices such as a connected electronic device (e.g., electronic device 104) and/or a server such as server 120. As shown in FIG. 3, once connected, the electronic device 104 can provide audio content to the media output device 150 for output (e.g., to play music or other audio content using speaker 151).

FIG. 3 also shows how the electronic device 104 may store (e.g., in memory 300) one or more virtual assistant applications such as virtual assistant application 304. The virtual assistant application 304 may include and/or access one or more voice recognition models that run on the processor 301 of the electronic device 104 to detect and/or differentiate words and/or phrases included in voice data provided from the media output device 150. The virtual assistant application 304 may be a native application that is provided with the electronic device 104 (e.g., by a manufacturer of the electronic device 104 and/or by a provider of an operating system of the electronic device 104). In one or more implementations, the electronic device 104 may also, or alternatively, store one or more virtual assistant applications provided by third-party providers that are different from the manufacturer of the electronic device 104 and/or the provider of the operating system of the electronic device 104.

In an example operational scenario, electronic device 104 may establish a connection with media output device 150, in part by providing the connection information, including an indicator of a device type of the electronic device 104, to the media output device 150. Responsive to establishing the connection between the media output device 150 and the electronic device 104, the media output device (e.g., one or more processors of the media output device such as processor 306) may determine (e.g., in an operation 309) a device type of the electronic device 104 based on the connection information. So that the media output device 150 is prepared to detect the specific trigger phrase for the virtual assistant application 304 of the electronic device 104 to which it is connected, the media output device 150 (e.g., processor 306 of the medial output device or another processor of the media output device) may select, based on the device type of the electronic device 104, one of the voice recognition models 308 that is stored in the memory 305, and may load the selected one of the voice recognition models 308 into the processor 306. In this example, the one one of the voice recognition models is loaded from the memory 305. However, it is appreciated that, in other implementations, the one of the voice recognition models can be provided on-the-fly from another device (E.g., the electronic device 104 or another device such a remote server). Using the loaded voice recognition model 308, the processor 306 may perform a low power detection operation for detecting, in voice input from the microphone 152, the trigger phrase associated with the selected/loaded one of the voice recognition models 308. In one or more implementations, the electronic device 104 may provide the media output device 150 with an indication of one or more particular virtual assistant applications and/or one or more corresponding trigger phrases that are active on the electronic device 104, (such as when the devices 104, 150 establish a connection and/or when a virtual assistant configuration change occurs at the electronic device 104), and the media output device 150 may load one or more corresponding voice recognition models 308 into the processor 306.

When the media output device 150 detects the trigger phrase in the voice input using the loaded one of the voice recognition models 308 that is specific to the virtual assistant application 304 of the electronic device 104, the media output device 150 may provide a trigger or trigger signal to the electronic device 104, as indicated in FIG. 3. Responsive to detecting the trigger phrase in the voice input using the loaded one of the voice recognition models 308, the media output device 150 may also provide feedback (e.g., audio or tactile feedback) to the user to indicate that the trigger phrase has been detected and/or that the virtual assistant application is being activate at the companion device. In one or more implementations, the trigger signal that is triggered by the detection of the trigger phrase using the loaded one of the voice recognition models 308 may be the same as, or functionally similar to, a trigger signal that is generated by a user input (e.g., a tap, a double tap, a squeeze, a press, or other user input) to a sensor 307 of the media output device. The electronic device 104 may receive the trigger signal from the media output device 150, prior to receiving audio input data such as voice data from the media output device 150. The electronic device 104 may then activate, responsive to the trigger signal, the virtual assistant application 304 for receiving voice data from the media output device 150, for subsequent interaction with and/or operation of the virtual assistant application.

Once a selected one of the voice recognition models 308 has been loaded to the processor 306, that voice recognition model 308 can remain loaded in the processor 306 until a new connection with a different companion device is detected by the media output device 150. For example, the electronic device 104 may disconnect from the media output device 150 (e.g., due to a user action at the electronic device 104, due to an increased distance between the electronic device 104 and the media output device 150, or due to the user storing or powering down the media output device 150), and the voice recognition model 308 loaded in the processor 306 may remain in the processor 306 following the disconnection. In this way, when the electronic device 104 later reconnects to the media output device 150, the voice recognition model 308 for the virtual assistant application 304 of that electronic device 104 does not need to be reloaded to the processor.

However, if, prior to reconnection of the electronic device 104, another electronic device (e.g., a device that has newly paired with the media output device or a device that has been previously paired with the media output device, such as electronic device 110 or electronic device 115 of FIG. 1) is connected to the media output device 150, the media output device 150 may determine, based on new connection information from the new electronic device, a new device type for the new electronic device. If the media output device 150 determines that the new device type is the same as the device type of electronic device 104, the media output device may take no action with respect to the voice recognition models. If the media output device 150 determines that the new device type is the different from the device type of electronic device 104, the media output device may select a new one of the voice recognition models 308 from the memory 305 based on the new device type, and load the selected new one of the voice recognition models 308 into the processor 306. Once loaded into the processor 306, the new one of the voice recognition models 308 can be used by the processor 306 for detection of a new trigger phrase that is specific to that new one of the voice recognition models 308, and that is specific to the virtual assistant application of the new electronic device. In this way, the media output device 150 can provide multi-mode voice triggering for multiple different virtual assistant applications from multiple different providers, without having to run a model that can distinguish between multiple different trigger phrases (which could be overly expensive in terms of computing and/or power resources for a compact audio device).

In one or more implementations in which more than one virtual assistant applications is provided by electronic device 104, a user of the electronic device 104 may be provided with options for selecting one of the virtual assistant applications (e.g., as a primary virtual assistant application). In scenarios in which, for example, a third party virtual assistant application is selected as a primary virtual assistant, the electronic device 104 may provide an indicator of the primary virtual assistant (and/or the corresponding trigger phrase) to the media output device 150.

In one or more implementations, the media output device 150 may store two voice recognition models 308, and may perform a binary determination of the device type of a companion device between two corresponding device types for the two models. In one or more other implementations, the media output device 150 may store three or more voice recognition modules 308 corresponding to three or more respective device types that can be identified from connection information and/or indicators received when a companion device of one of the device types is connected. In one or more implementations, information that indicates a device type may be or include an indicator of a particular virtual assistant and/or a corresponding trigger phrase for the particular virtual assistant (e.g., in scenarios in which a single virtual assistant corresponding to the device type is provided at the companion device).

Voice recognition models that are trained to detect a (e.g., single) corresponding trigger phrase are described herein in connection with various examples for triggering a virtual assistant application. However, it is appreciated that the voice recognition models described for selection (based on a device type of a companion device) and loading into the processor of a media output device may be trained to detect a (e.g., single) corresponding trigger phrase for triggering any other voice-activated application or service at a companion device.

Figure 4:
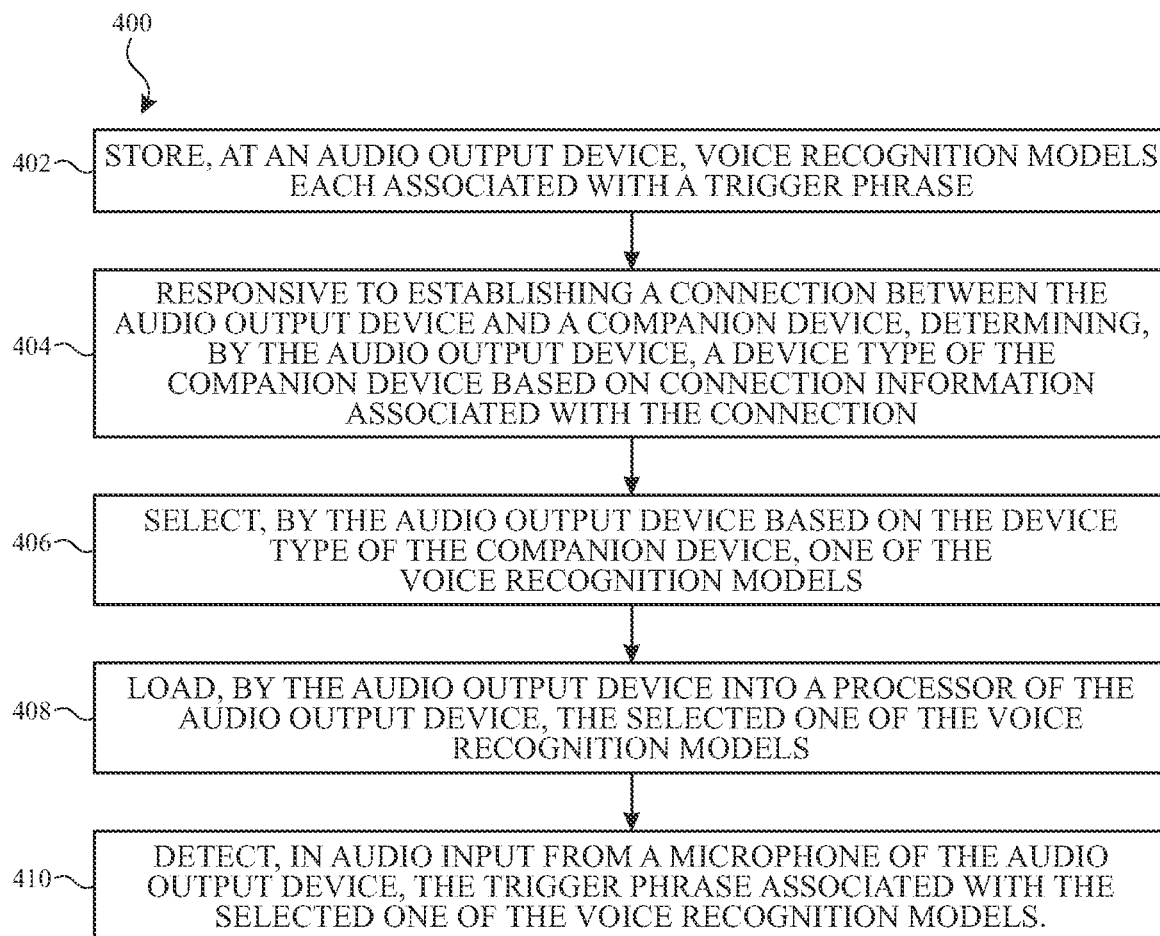
FIG. 4 illustrates a flow diagram for an example process for operating a media output device in accordance with implementations of the subject technology.

FIG. 4 illustrates a flow diagram of an example process 400 for operating a media output device such as an audio output device in accordance with implementations of the subject technology. For explanatory purposes, the process 400 is primarily described herein with reference to the media output device 150 and electronic device 104 of FIGS. 1-3. However, the process 400 is not limited to the media output device 150 and electronic device 104 of FIGS. 1-3, and one or more blocks (or operations) of the process 400 may be performed by one or more other components of other suitable devices, including the electronic device 110, the electronic device 115, and/or the servers 120. Further for explanatory purposes, some of the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

As illustrated in FIG. 4, at block 402, a media output device such as an audio output device (e.g., media output device 150) may store (e.g., in memory 305 of FIG. 3) voice recognition models (e.g., voice recognition models 308) each associated with one or more trigger phrases. As described herein, each trigger phrase may be a trigger phrase for activating a virtual assistant application or other voice-controlled application at the companion device (e.g., launching or activating an active listening mode using one or more additional voice recognition models at the companion device). In one or more implementations, the trigger phrase may be an operating-system specific trigger phrase. The memory of the audio output device may, for example, store two or more voice recognition models. In one or more implementations, the audio output device may include one or more processors such as processor 306 of FIG. 3, and/or one or more other components such as one or more speakers (e.g., speaker 151) and/or one or more microphones (e.g., microphone 152).

At block 404, responsive to establishing a connection between the audio output device and a companion device (e.g., electronic device 104, or any other suitable electronic device), the audio output device (e.g., one or more processors of the audio output device) determines a device type of the companion device based on connection information associated with the connection. In one or more implementations, the device type corresponds to an operating system of the companion device. In one or more implementations, the device type corresponds to a manufacturer of the companion device. In one or more implementations, the device type corresponds to a vendor of the companion device. In one or more implementations, the device type corresponds to a service provider associated with the companion device.

In one or more implementations, the audio output device (e.g., one or more processors of the audio output device) may receive the connection information while establishing a connection (e.g., during handshake operations for establishing the connection). In one or more implementations, the audio output device (e.g., one or more processors of the audio output device) may determine the device type of the companion device by obtaining an identifier (e.g., a vendor identifier, a MAC address, or the like) of a provider (e.g., a vendor, a manufacturer, a service provider, or the like) of the companion device in the connection information.

In one or more implementations, the connection may be a Bluetooth connection. The connection information may include, for example, one or more Bluetooth packets. The Bluetooth packets may be provided from the companion device to the audio output device during, for example, establishment of a connection and/or during ongoing communications with the audio output device. Determining the device type based on the connection information may include identifying a vendor identifier or other identifier in the one or more Bluetooth packets.

In one or more implementations, the audio output device may also, or alternatively, receive an indicator of a particular virtual assistant and/or a particular corresponding trigger phrase from the companion device (e.g., as part of establishing the connection with the companion device or separately from connection information received from the companion device).

At block 406, the audio output device (e.g., one or more processors of the audio output device) selects, based on the device type of the companion device and/or based on the indicator received from the companion device, one of the voice recognition models. For example, each voice recognition model may be stored in the memory of the audio output device in connection with a corresponding device type and/or other indicator or identifier. The audio output device may select the one of the voice recognition models by selecting the voice recognition model that is stored in connection with the identified device type and/or the received indicator.

At block 408, the audio output device (e.g., one or more processors of the audio output device) loads the selected one of the voice recognition models (e.g., into one of the one or more processors such as processor 306, from memory such as memory 305).

At block 410, the audio output device (e.g., the one or more processors of the audio output device into which the selected one of the voice recognition models has been loaded) detects, based on audio input from the microphone (e.g., microphone 152), the trigger phrase associated with the selected one of the voice recognition models. The audio output device (e.g., one or more processors of the audio output device in which the selected one of the voice recognition models has been loaded) may then perform a low power listening operation using the selected one of the voice recognition models (e.g., to listen for the corresponding trigger phrase). In one or more implementations, the low power listening operation may include periodically or continuously providing audio input (e.g., voice input as described above in connection with FIG. 3) from the microphone to the selected one of the voice recognition models. The low power listening operation may trigger an active listening mode for the companion device, responsive to an output of the selected one of the voice recognition models that indicates a detection of the trigger phrase in the audio input.

In one or more implementations, the audio output device may include a button that is also operable to trigger the active listening mode at the companion device (e.g., a button formed, in part, by sensor 307 of FIG. 3). In one or more implementations, the audio output device may include a speaker for output of audio content received from the companion device over the connection (e.g., speaker 151). In one or more implementations, the processor of the audio output device may operate the speaker of the audio output device for output of audio content received from the companion device over the connection.

In one or more implementations, the audio output device (e.g., one or more processors of the audio output device) may detect a new connection to a new companion device (e.g., electronic device 110, or electronic device 115 and/or any other suitable electronic device) other than the companion device. The audio output device (e.g., one or more processors of the audio output device) may then replace, based on new connection information associated with the new connection, the loaded one of the voice recognition models with a different one of the voice recognition models. The different one of the voice recognition models may be trained to detect, in a voice input, a different trigger phrase that activates a different virtual assistant application.

Figure 5:
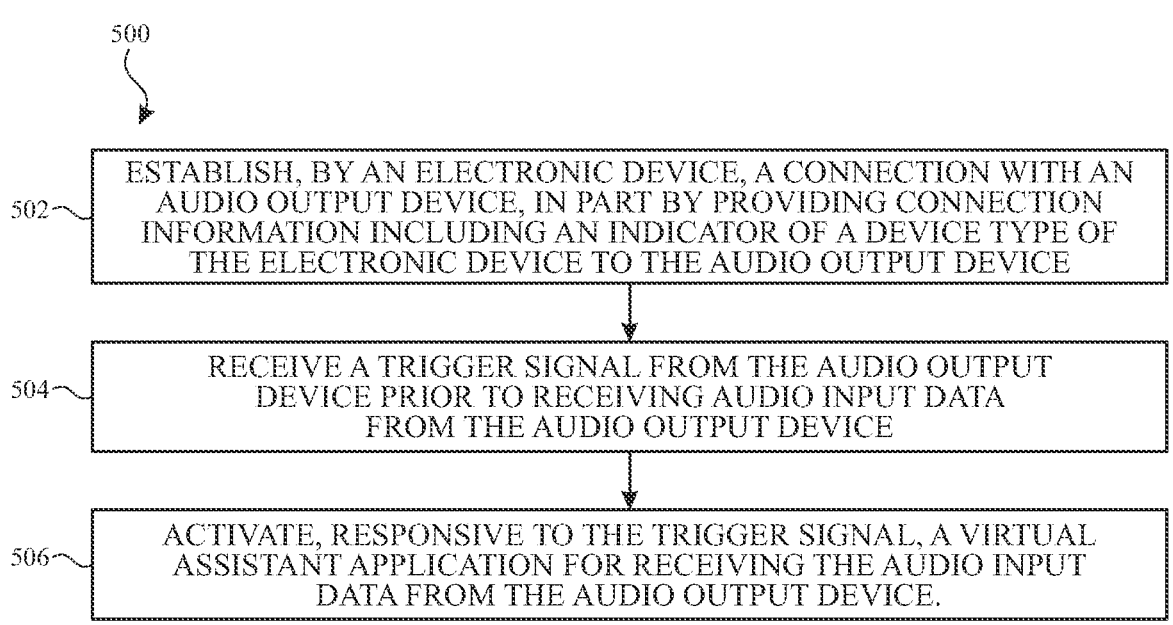
FIG. 5 illustrates a flow diagram for an example process for operating an electronic device in accordance with implementations of the subject technology.

FIG. 5 illustrates a flow diagram of an example process 500 for operating an electronic device in accordance with implementations of the subject technology. For explanatory purposes, the process 500 is primarily described herein with reference to the media output device 150 and electronic device 104 of FIGS. 1-3. However, the process 500 is not limited to the media output device 150 and electronic device 104 of FIGS. 1-3, and one or more blocks (or operations) of the process 500 may be performed by one or more other components of other suitable devices, including the electronic device 110, the electronic device 115, and/or the servers 120. Further for explanatory purposes, some of the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

As illustrated in FIG. 5, at block 502, an electronic device, such as electronic device 104, may establish a connection with an audio output device, in part by providing connection information including an indicator of a device type of the electronic device to the audio output device. The device type of the electronic device may correspond, for example, to a manufacturer (or other provider) of the electronic device that is different from a manufacturer (or other provider) of the audio output device. The device type of the electronic device may correspond, for example, to a manufacturer (or other provider) of the electronic device that is the same as the manufacturer (or other provider) of the audio output device. In one or more implementations, the electronic device may provide an indicator of a particular virtual assistant and/or a particular trigger phrase for the particular virtual assistant to the audio output device (e.g., as part of establishing the connection, or responsive to a change of virtual assistant at the electronic device).

At block 504, the electronic device may receive a trigger signal from the audio output device prior to receiving audio input data from the audio output device. For example, the audio output device may generate the trigger signal responsive to an output from a voice recognition model at the audio output device, the voice recognition model having been selected by the audio output device based on the connection information and/or the indication of the trigger phrase and/or the particular virtual assistant that was provided by the electronic device.

At block 506, the electronic device may activate, responsive to the trigger signal, a virtual assistant application for receiving the audio input data from the audio output device. Once activated, the virtual assistant application may perform an active listening operation in cooperation with the audio output device. For example, performing an active listening operation in cooperation with the audio output device may include receiving voice data that is based on voice input captured by a microphone of the audio output device, from the audio output device, and providing the voice data to one or more voice recognition models at the electronic device that are capable of (e.g., trained for) identifying and/or differentiating various words and phrases for voice control of the virtual assistant operation. At any time after the establishment of the connection, the electronic device may also provide (e.g., over the connection) audio content to the audio output device for output by the audio output device.

As described above, one aspect of the present technology is the gathering and use of data available from specific and legitimate sources for training and/or operating machine learning models. The present disclosure contemplates that in some instances, this gathered data may include personal information data that uniquely identifies or can be used to identify a specific person. Such personal information data can include voice samples, voice profiles, demographic data, location-based data, online identifiers, telephone numbers, email addresses, home addresses, biometric data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for identifying a device type or recognizing a trigger phrase using a voice recognition model.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates aspects in which users selectively block the use of, or access to, personal information data. That is, the present disclosure contemplates that hardware and/or software elements can be provided to prevent or block access to such personal information data. For example, in the example of recognizing device types and/or trigger phrases, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed aspects, the present disclosure also contemplates that the various aspects can also be implemented without the need for accessing such personal information data. That is, the various aspects of the present technology are not rendered inoperable due to the lack of all or a portion of such personal information data.

Figure 6:
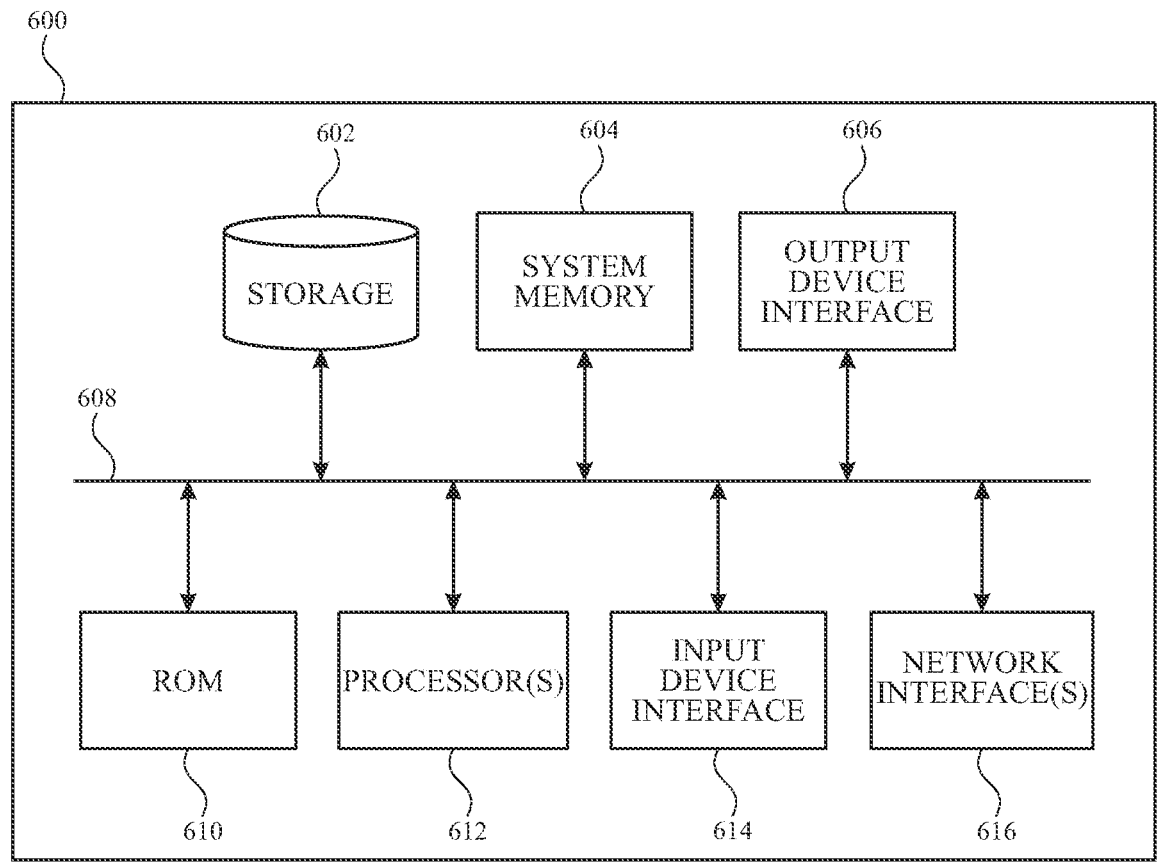
FIG. 6 illustrates an electronic system with which one or more implementations of the subject technology may be implemented.

FIG. 6 illustrates an electronic system 600 with which one or more implementations of the subject technology may be implemented. The electronic system 600 can be, and/or can be a part of, the media output device 150, the electronic device 104, the electronic device 110, the electronic device 115, and/or the server 120 as shown in FIG. 1. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610 (which are each implemented as a non-transitory computer-readable medium). From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes, such as the electronic device 110 shown in FIG. 1, through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

In accordance with aspects of the disclosure, a method is provided that includes storing, at an audio output device, voice recognition models each associated with a trigger phrase; responsive to establishing a connection between the audio output device and a companion device, determining, by the audio output device, a device type of the companion device based on connection information associated with the connection; selecting, by the audio output device based on the device type of the companion device, one of the voice recognition models; loading, by the audio output device into a processor of the audio output device, the selected one of the voice recognition models; and detecting, based on an audio input from a microphone of the audio output device, the trigger phrase associated with the selected one of the voice recognition models.

In accordance with aspects of the disclosure, an audio output device is provided that includes a memory configured to store voice recognition models each associated with a trigger phrase; an audio transducer; and at least one processor configured to: responsive to establishing a connection between the audio output device and a companion device, determine a device type of the companion device based on connection information associated with the connection; select, based on the device type of the companion device, one of the voice recognition models; load the selected one of the voice recognition models; and detect, based on an audio input from the audio transducer, the trigger phrase associated with the selected one of the voice recognition models.

In accordance with aspects of the disclosure, an electronic device is provided that includes a memory; and at least one processor configured to: establish a connection with an audio output device, in part by providing connection information including an indicator of a device type of the electronic device to the audio output device; receive a trigger signal from the audio output device prior to receiving audio input data from the audio output device; and activate, responsive to the trigger signal, a virtual assistant application for receiving the audio input data from the audio output device.

In accordance with aspects of the disclosure, an electronic device is provided that includes a memory; and at least one processor configured to: establish a connection with an audio output device, in part by providing an indicator of a particular virtual assistant at the electronic device to the audio output device; receive a trigger signal from the audio output device prior to receiving audio input data from the audio output device, where the trigger signal corresponds to the particular virtual assistant; and activate, responsive to the trigger signal, the particular virtual assistant for receiving the audio input data from the audio output device.

In accordance with aspects of the disclosure, an electronic device is provided that includes a memory; and at least one processor configured to: provide, to an audio output device, an indicator of a particular virtual assistant at the electronic device; receive a trigger signal from the audio output device prior to receiving audio input data from the audio output device, where the trigger signal corresponds to the particular virtual assistant; and activate, responsive to the trigger signal, the particular virtual assistant for receiving the audio input data from the audio output device.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure described herein.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

What is claimed is:

1. An audio output device, comprising:
   a memory configured to store voice recognition models each associated with a trigger phrase;
   an audio transducer; and
   at least one processor configured to:

responsive to establishing a connection between the audio output device and a companion device, determine a device type of the companion device based on connection information associated with the connection;

select, based on the device type of the companion device, one of the voice recognition models;

load the selected one of the voice recognition models; and detect, based on an audio input from the audio transducer, the trigger phrase associated with the selected one of the voice recognition models.

2. The audio output device of claim 1, wherein the memory is configured to store two or more voice recognition models.

3. The audio output device of claim 1, wherein the device type corresponds to an operating system of the companion device.

4. The audio output device of claim 1, wherein the at least one processor is configured to detect the trigger phrase by performing a low power listening operation using the selected one of the voice recognition models.

5. The audio output device of claim 4, wherein the low power listening operation comprises:

periodically or continuously providing the audio input from the audio transducer to the selected one of the voice recognition models; and triggering an active listening mode for the companion device responsive to an output of the selected one of the voice recognition models that indicates a detection of the trigger phrase in the audio input.

6. The audio output device of claim 5, further comprising a button operable to trigger the active listening mode.

7. The audio output device of claim 1, further comprising a speaker for output of audio content received from the companion device over the connection.

8. The audio output device of claim 1, wherein the at least one processor is further configured to:

receive the connection information while establishing the connection; and determine the device type of the companion device by obtaining an identifier of a provider of the companion device in the connection information.

9. The audio output device of claim 1, wherein the at least one processor is further configured to:

detect a new connection to a new companion device other than the companion device; and replace, based on new connection information associated with the new connection, the loaded one of the voice recognition models with a different one of the voice recognition models.

10. A method, comprising:

storing, at an audio output device, voice recognition models each associated with a trigger phrase;

responsive to establishing a connection between the audio output device and a companion device, determining, by the audio output device, a device type of the companion device based on connection information associated with the connection;

selecting, by the audio output device based on the device type of the companion device, one of the voice recognition models; and loading, by the audio output device into a processor of the audio output device, the selected one of the voice recognition models; and detecting, based on an audio input from a microphone of the audio output device, the trigger phrase associated with the selected one of the voice recognition models.

11. The method of claim 10, wherein the connection is a Bluetooth connection, wherein the connection information comprises one or more Bluetooth packets, and wherein determining the device type based on the connection information comprises identifying a vendor identifier in the one or more Bluetooth packets.

12. The method of claim 10, wherein the voice recognition models comprise two or more voice recognition models.

13. The method of claim 10, wherein detecting the trigger phrase comprises performing a low power listening operation using the selected one of the voice recognition models.

14. The method of claim 13, wherein the low power listening operation comprises:

periodically or continuously providing the audio input from the microphone to the selected one of the voice recognition models; and triggering an active listening mode for the companion device responsive to an output of the selected one of the voice recognition models that indicates a detection of the trigger phrase in the audio input.

15. The method of claim 14, wherein the trigger phrase is an operating-system specific trigger phrase associated with an operating system of the companion device.

16. The method of claim 10, further comprising operating a speaker of the audio output device for output of audio content received from the companion device over the connection.

17. The method of claim 10, further comprising:

detecting a new connection to a new companion device other than the companion device; and replacing, based on new connection information associated with the new connection, the loaded one of the voice recognition models with a different one of the voice recognition models.

18. A non-transitory computer-readable medium storing instructions which, when executed by one or more processors, cause the one or more processors to:

responsive to establishing a connection between an audio output device and a companion device, determine a device type of the companion device based on connection information associated with the connection;

select, based on the device type of the companion device, one of a plurality of voice recognition models stored at the audio output device, each of the plurality of voice recognition models associated with a trigger phrase;

load the selected one of the voice recognition models into a processor of the audio output device; and detect, based on an audio input from an audio transducer of the audio output devices, the trigger phrase associated with the selected one of the plurality of voice recognition models.

19. The non-transitory computer-readable medium of claim 18, wherein the device type corresponds to an operating system of the companion device.

20. The non-transitory computer-readable medium of claim 18, wherein instructions, when executed by the one or more processors, further cause the one or more processors to detect the trigger phrase by performing a low power listening operation using the selected one of the voice recognition models.

21. The non-transitory computer-readable medium of claim 20, wherein the low power listening operation comprises:

periodically or continuously providing the audio input from the audio transducer to the selected one of the voice recognition models; and triggering an active listening mode for the companion device responsive to an output of the selected one of the voice recognition models that indicates a detection of the trigger phrase in the audio input.

\* \* \* \* \*